Patented Dec. 19, 1950

2,534,242

UNITED STATES PATENT OFFICE 2,534,242

8-HALOXANTHINE SALTS OF 2-ALKYL-9-PHENYL-2,3,4,9-TETRAHYDRO-1-PYRIDINDENES AND THE PRODUCTION THEREOF

John W. Cusic, Skokie, Ill., assignor to G. D. Searle & Co., Chicago, Ill., a corporation of Illinois No Drawing. Application November 2, 1949, Serial No. 125,155

7 Claims. (Cl. 260—253)

This invention relates to haloxanthine salts of 2 - alkyl - 9 - phenyl - 2,3,4,9 - tetrahydro - 1 - pyridindenes and to the production thereof. More particularly this invention relates to 8-haloxanthine salts of organic bases having the following general structural formula

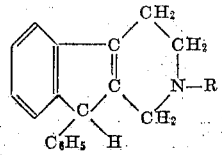

wherein R is a lower alkyl radical, such as methyl, ethyl, propyl or butyl, and wherein the 8-haloxanthine contains a hydrogen atom in position 7.

This application is a continuation-in-part of my copending application Serial No. 71,763, filed January 19, 1949.

It is widely recognized that 2-alkyl-9-phenyl-2,3,4,9-tetrahydro-1-pyridindenes elicit certain undesirable side reactions and toxic manifestations. The most common effects are dizziness and sleepiness following the administration of the medication. In certain cases there may be nausea and vomiting. Other effects which have been noticed include weakness, narcolepsy, indigestion, coldness of the extremities, exhaustion, irritability, blurred vision, confusion, and in rare instances collapse. The symptoms produced by 2 - alkyl - 9 - phenyl - 2,3,4,9 - tetrahydro - 1 - pyridindenes are often severe enough to warrant reduced dosage or discontinuance of the medication.

It is the object of this invention to produce therapeutic compositions of matter which are relatively free from untoward reactions. A further object is to produce compositions of 2-alkyl-9 - phenyl - 2,3,4,9 - tetrahydro - 1 - pyridindenes and haloxanthines of reduced toxicity. Another object is to produce compositions having enhanced therapeutic efficacy. Other objects will be apparent to those skilled in the art, in view of the disclosure given herein.

I have discovered that salts of 2-alkyl-9-phenyl-2,3,4,9-tetrahydro-1-pyridindenes with haloxanthines produce little effect on the central nervous system and are therapeutically more useful than any of the individual components alone. The salts of 2 - alkyl - 9 - phenyl - 2,3,4,9 - tetrahydro - 1 - pyridindenes and haloxanthines exert a potentiating effect and show enhanced activity in combatting the effects of histamine. As such they are especially useful in the treatment of anaphylaxis and of allergic disorders.

Certain of the compositions within the scope of my invention are so free from undesirable side effects that they may actually be used in suppressing those undesirable symptoms commonly elicited by the usual antihistaminic drugs. For instance, my compounds can be used to prevent or alleviate nausea, motion sickness, dizziness and other distressing reactions.

Among the halogenated xanthines to which this invention pertains are the chloro, bromo, and iodo derivatives of theophylline, and related xanthines which have a hydrogen at position 7.

In particular this invention is concerned with acidic xanthines such as 8-chlorotheophylline
8-bromotheophylline
8-chloroxanthine
3-methyl-8-chloroxanthine
8-bromoxanthine
3-methyl-8-bromoxanthine
1,3-diethyl-8-bromoxanthine
1,3-diethyl-8-chloroxanthine
8-iodotheophylline
8-iodo-1,3-diethylxanthine Compositions of organic bases and haloxanthines are readily prepared by dissolving the base in a suitable solvent and treating the resulting solution with a solution of a halogenated xanthine. Solvents which are satisfactory for this reaction include the lower alcohols and ketones and their mixtures with water, ethers and hydrocarbons. Generally small excesses of the bases are desirable in these synthetic procedures. The desired salt generally crystallizes out of the solution on chilling or standing, or may be precipitated by addition of a solvent such as ether or benzene. A simple and efficient alternative method is that of heating together at 50–100° C. equivalent amounts of the liquid organic base and of the haloxanthine, with good mixing with a small amount of water or alcohol. As the materials react the mixture generally forms a thick paste or granular solid. On chilling the product becomes hard and solid and may be broken up, ground to a powder and dried. The compounds of this invention can also be produced by refluxing a solution of an ammonium salt of a haloxanthine in a lower alcohol or ketone with an equivalent of the organic base. During the heating, ammonia is evolved and the haloxanthine salt of the organic base is formed. On chilling this salt precipitates.

The following examples illustrate in more detail my invention, but in no way are to be construed as limiting it in spirit or in scope. It will be apparent to those skilled in the art that a variety of 2-alkyl-9-phenyl-2,3,4,9-tetrahydro-1-pyridindines can be used in place of the compounds recited without departing from the scope of the invention. Similarly other haloxanthines than those named are also operable and are employed in analogous methods.

*Example 1*

10 parts of 2-methyl-9-phenyl-2,3,4,9-tetrahydro-1-pyridindene hydrogen tartrate are dissolved in the minimum of warm water. The solution is cooled and made alkaline with an excess of sodium bicarbonate. The organic base is extracted with warm benzene. The benzene solution is dried and evaporated; leaving 8 parts of 2-methyl-9-phenyl-2,3,4,9-tetrahydro-1-pyridindene. This base has the formula

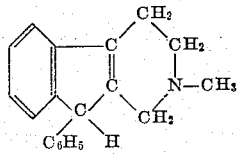

The base is dissolved in 40 parts of methyl ethyl ketone and 5 parts of water and the solution is heated with 6 parts of 8-chlorotheophylline until the latter is nearly dissolved. The hot solution is filtered and evaporated, yielding as a residue the 8-chlorotheophylline salt of 2-methyl-9-phenyl-2,3,4,9-tetrahydro - 1 - pyridindene. The latter is dried in vacuum and is an amorphous reddish powder. Analysis indicates that it is composed of approximately equal molecular amounts of the base and of 8-chlorotheophylline.

*Example 2*

10 parts of 2-methyl-9-phenyl-2,3,4,9-tetrahydro-1-pyridindene in 50 parts of methyl ethyl ketone and 5 parts of water are heated with 9 parts of 8-bromotheophylline with good agitation. The hot solution is filtered, evaporated and dried, yielding a reddish powder, which is the 8-bromotheophylline salt of 2-methyl-9-phenyl - 2,3,4,9-tetrahydro-1-pyridindene. Analysis showed this salt to be an equimolecular mixture of the base and the haloxanthine.

I claim:

1. An 8-haloxanthine salt of an organic base of the formula

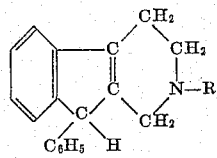

wherein R is a lower alkyl radical, and wherein the 8-haloxanthine contains a hydrogen atom in position 7.

2. An 8-halotheophylline salt of a base as in claim 1.

3. An 8-halotheophylline salt of 2-methyl-9-phenyl-2,3,4,9-tetrahydro-1-pyridindene, which has the formula

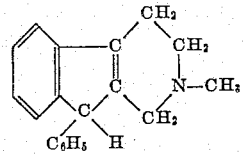

4. The 8-chlorotheophylline salt of 2-methyl-9-phenyl-2,3,4,9-tetrahydro-1-pyridindene, which has the formula

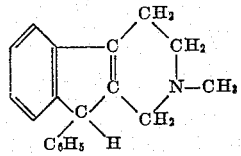

5. The 8-bromotheophylline salt of 2-methyl-9-phenyl-2,3,4,9-tetrahydro-1-pyridindene, which has the formula

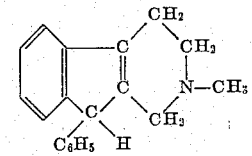

6. The method of producing an 8-haloxanthine salt of a 2-alkyl-9-phenyl-2,3,4,9-tetrahydro-1-pyridindene, which has the formula

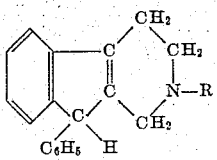

wherein R is a lower alkyl radical which comprises heating an 8-haloxanthine which contains a hydrogen atom in the 7-position, with a 2-alkyl-9-phenyl-2,3,4,9-tetrahydro-1-pyridindene in an inert, water-miscible organic solvent, and separating said salt from the solution.

7. The method of producing an 8-halotheophylline salt of 2-methyl-9-phenyl-2,3,4,9-tetrahydro-1-pyridindene, which has the formula

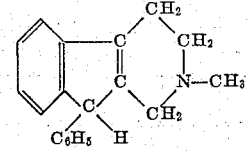

which comprises heating an 8-halotheophylline with 2-methyl-9-phenyl-2,3,4,9-tetrahydro-1-pyridindene in methyl ethyl ketone and separating said salt from the solution.

JOHN W. CUSIC.

No references cited.